US009796044B2

(12) United States Patent
Mourou et al.

(10) Patent No.: US 9,796,044 B2
(45) Date of Patent: Oct. 24, 2017

(54) MANUFACTURING PROCESS FOR HARD FACING ALUMINUM INJECTION MOLDS

(71) Applicant: GM Global Technology Operations LLC, Detroit, MI (US)

(72) Inventors: Julien P. Mourou, Bloomfield Hills, MI (US); James E. Osbourn, Washington, MI (US); Brian J. Parent, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 318 days.

(21) Appl. No.: 14/467,756

(22) Filed: Aug. 25, 2014

(65) Prior Publication Data
US 2016/0052089 A1 Feb. 25, 2016

(51) Int. Cl.
*C23C 14/14* (2006.01)
*B23K 26/00* (2014.01)
*B23K 26/12* (2014.01)
*B29C 33/38* (2006.01)
*B29C 33/74* (2006.01)
*B23K 26/14* (2014.01)
*B23K 26/34* (2014.01)
*B23P 15/00* (2006.01)
*B29L 31/00* (2006.01)
(Continued)

(52) U.S. Cl.
CPC .......... *B23K 26/0093* (2013.01); *B23K 26/12* (2013.01); *B23K 26/14* (2013.01); *B23K 26/34* (2013.01); *B23P 15/007* (2013.01); *B29C 33/3842* (2013.01); *B29C 33/74* (2013.01); *B23K 2203/10* (2013.01); *B23K 2203/14* (2013.01); *B29K 2905/02* (2013.01); *B29K 2909/04* (2013.01); *B29L 2031/757* (2013.01)

(58) Field of Classification Search
CPC .. B23K 26/345; B23K 26/12; B23K 26/0093; B23K 26/421; B23K 26/422; B29C 33/74; B29C 33/3842; B29K 2905/02; B29K 2909/04; B29L 2031/757
USPC .................................................. 427/595–597
See application file for complete search history.

(56) References Cited

U.S. PATENT DOCUMENTS 6,049,978 A * 4/2000 Arnold ................. B23K 20/021
29/402.07
2002/0157249 A1 * 10/2002 Kim ....................... B23K 26/34
29/888.44
(Continued)

FOREIGN PATENT DOCUMENTS

CN 101012561 A 8/2007
CN 101880854 A 11/2010
(Continued)

OTHER PUBLICATIONS

CN 102943199 Machine Translation.*
(Continued)

*Primary Examiner* — Michael Wieczorek
*Assistant Examiner* — Michael G Miller
(74) *Attorney, Agent, or Firm* — BrooksGroup

(57) ABSTRACT

A number of variations may include a product that may include a substrate that may include an aluminum-nickel alloy and at least one surface and a coating that may include a metallic material deposited over the at least one surface via laser cladding.

15 Claims, 1 Drawing Sheet

(51) Int. Cl.
B23K 103/10 (2006.01)
B23K 103/14 (2006.01)

(56) References Cited

U.S. PATENT DOCUMENTS

| | | | | |
|---|---|---|---|---|
| 2005/0194363 A1* | 9/2005 | Hu | ............... | B23K 26/032 |
| | | | | 219/121.64 |
| 2009/0057275 A1* | 3/2009 | Chen | ............... | B22F 7/064 |
| | | | | 219/76.1 |
| 2011/0159138 A1* | 6/2011 | Paget | ............... | B29C 33/56 |
| | | | | 425/525 |
| 2011/0203707 A1* | 8/2011 | Mourer | ............ | C22C 19/056 |
| | | | | 148/677 |

FOREIGN PATENT DOCUMENTS

| | | | |
|---|---|---|---|
| CN | 102560478 A | | 7/2012 |
| CN | 102943199 A | * | 2/2013 |

OTHER PUBLICATIONS

Han ("Modeling of Laser Cladding with Powder Injection", L. Han et al, Metallurgical and Materials Transactions B, vol. 35B, Dec. 2004, pp. 1139-1150).*

Chinese Office Action dated Jun. 28, 2017; Application No. 201510525309.7; Applicant: GM Global Technology Operations LLC.; 33 pages.

Keisuke Uenishi et al. "Formation of surface layer based on $Al_3Ti$ on aluminum by laser cladding and its compatibility with ceramics", Intermetallics, vol. 7, p. 553-559.

\* cited by examiner

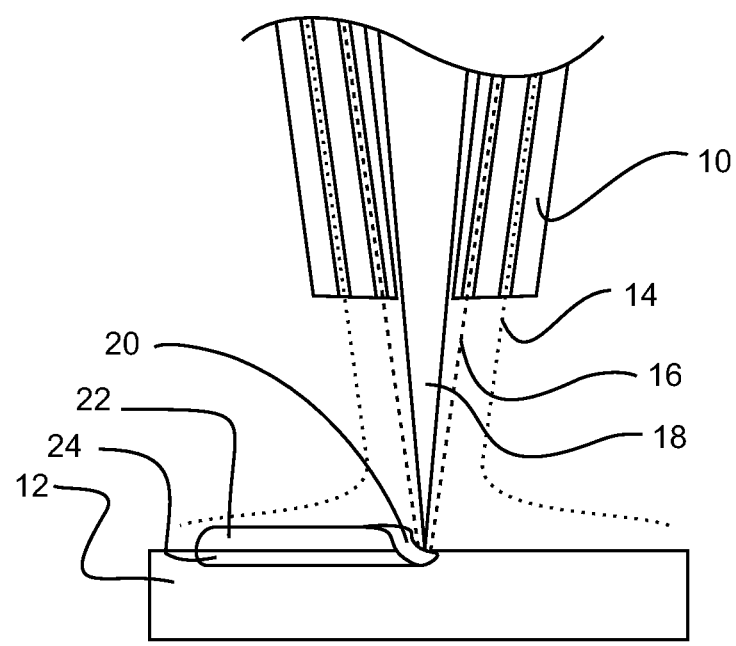

MANUFACTURING PROCESS FOR HARD FACING ALUMINUM INJECTION MOLDS

TECHNICAL FIELD

The field to which the disclosure generally relates includes laser cladding of aluminum substrates.

BACKGROUND

Injection molding processes traditionally use tooling and dies having high hardness, particularly in the casting of plastics and composites. Tooling and dies used in injection molding may include steel or hardened tool steels. In some instances, aluminum-nickel alloys may undergo a hard-facing process that allows for tooling and dies to be formed from low cost, light-weight aluminum-nickel alloys.

SUMMARY OF ILLUSTRATIVE VARIATIONS

A number of variations may include a method that may include providing a substrate that may include an aluminum alloy and a first surface; machining the first surface to define a cavity; processing the cavity to remove oxidation of the aluminum-nickel alloy; and cladding the substrate with a coating via laser hard facing the substrate. The laser hard facing may include providing a metallic material onto the first surface; providing a laser and applying the focal point of a laser beam on the metallic material; flowing a shielding gas around the laser beam; melting the metallic material via the laser beam such that a melt pool, the coating, and dilution layer are formed on the first surface. The method may further include fine machining the coating and polishing the coating.

Another variation may include a method that may include providing a substrate that may include an aluminum alloy and a first surface; machining the first surface to define a cavity; processing the cavity to remove oxidation of the aluminum-nickel alloy; and cladding the substrate with a coating via laser hard facing the substrate. The laser hard facing may include providing a metallic material that may include titanium carbide onto the first surface; providing a laser and applying the focal point of a laser beam on the metallic material; flowing a shielding gas around the laser beam; tracking the laser beam across the metallic material on the first surface of the substrate such that the resulting coating and dilution layer cover the entire first surface prior to flowing a shielding gas around the laser beam; melting the metallic material via the laser beam such that a melt pool, the coating, and dilution layer are formed on the first surface. The method may further include fine machining the coating and polishing the coating.

Another variation may include a method that may include providing a substrate that may include an aluminum-nickel alloy and a first surface; machining the first surface to define a cavity; processing the cavity to remove oxidation of the aluminum-nickel alloy; and cladding the substrate with a coating via laser hard facing the substrate. The laser hard facing may include providing a metallic powder material that may include titanium carbide onto the first surface by flowing the metallic material onto the first surface via a metallic powder material feed; providing a laser and applying the focal point of a laser beam on the metallic powder material; flowing a shielding gas around the laser beam; tracking the laser beam across the metallic powder material on the first surface of the substrate such that the resulting coating and dilution layer cover the entire first surface prior to flowing a shielding gas around the laser beam; melting the metallic powder material via the laser beam such that a melt pool, the coating, and dilution layer are formed on the first surface. The method may further include fine machining the coating and polishing the coating.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts one variation of laser cladding a surface with a coating.

DETAILED DESCRIPTION OF ILLUSTRATIVE VARIATIONS

The following description of the variations may be merely illustrative in nature and may be in no way intended to limit the scope of the invention, its application, or uses. The following description of variants may be only illustrative of components, elements, acts, products, and methods considered to be within the scope of the invention and are not in any way intended to limit such scope by what may be specifically disclosed or not expressly set forth. The components, elements, acts, products, and methods as described herein may be combined and rearranged other than as expressly described herein and still are considered to be within the scope of the invention.

Hard facing, and more particularly, laser hard facing of metallic surfaces alloys may consist of depositing a metallic material in powder or wire form and melting the metallic material by use of a laser over the surface of a substrate. In this way, the substrate may be coated in the metallic material thereby improving material characteristics such as corrosion resistance, wear resistance, and thermal conductivity. In some instances, the laser and metallic material may traverse the substrate as metallic material may be deposited or the substrate may move beneath a stationary laser while metallic material may be deposited.

The metallic material coated onto a substrate may be fed via a nozzle or nozzles such that the metallic material meets the substrate at a point where a laser may melt the metallic material, forming a melt pool, which may subsequently harden into a coating on a substrate. The laser and metallic material may be deposited in a controlled fashion such that the substrate may be partially or fully covered by the hard-facing metallic material. In some instances, the metallic material may be deposited onto the substrate prior to melting the metallic material.

The laser, when used to melt the metallic material, may be shielded by a shielding gas flowed around the laser beam. Laser power, laser focal point, hard-facing rate, and metallic material deposition rate may all be varied to achieve desirable material characteristics of the deposited metallic material. In some instances, the hardness of the formed hard face may range from about 400 kg/mm$^2$ to about 600 kg/mm$^2$.

The substrate may be a die including an aluminum-nickel alloy used to injection mold plastics, composites, or fiber reinforced plastics. In some instances, the substrate may be machined to remove oxidation prior to being laser cladded with a coating. Subsequently, the coating may be post-processed including fine machining and polishing.

The metallic material may include titanium and titanium carbide and any combination or sub-combination thereof.

FIG. 1 illustrates a number of variations, which may include a method using a nozzle 10 that may project a laser beam 18 and a metallic material 16 on a substrate 12. In a number of variations the substrate 12 may be an injection molding die. The laser beam 18 and a metallic material 16 may be surrounded by a shielding gas 14 that may also be projected by the nozzle 10. In a number of variations the nozzle 10 may have a center channel though which the laser beam may pass. A first concentric channel may surround the center channel and may be used to deliver powdered metal with a carrier gas. A second concentric channel may surround the first concentric channel and may be used to deliver a shielding gas. The laser beam 18 and a metallic material 16 may meet at the substrate 12 whereby the metallic material 16 is melted into melt pool 20 wherein the metallic material 16 and the substrate 12 form a coating 22 and a dilution layer 24 as the nozzle 10 is tracked across a surface of the substrate 12.

In a number of variations the metallic material 16 may include aluminum-nickel alloys. In a number of variations the metallic material 16 may or may not include TiC particles. In a number of variations the metallic material 16 may include aluminum-nickel alloys and TiC particles.

According to variation 1, a method may include providing a substrate that may include an aluminum alloy and a first surface; machining the first surface to define a cavity; processing the cavity to remove oxidation of the aluminum-nickel alloy; and cladding the substrate with a coating via laser hard facing the substrate. The laser hard facing may include providing a metallic material onto the first surface; providing a laser and applying the focal point of a laser beam on the metallic material; flowing a shielding gas around the laser beam; melting the metallic material via the laser beam such that a melt pool, the coating, and dilution layer are formed on the first surface. The method may further include fine machining the coating and polishing the coating.

Variation 2 may include a method as set forth in variation 1 that may include tracking the laser beam across the metallic material on the first surface of the substrate such that the resulting coating and dilution layer cover the entire first surface prior to flowing a shielding gas around the laser beam.

Variation 3 may include a method as set forth in variation 1 or 2 that may include tracking the substrate beneath the laser beam such that the resulting coating and dilution layer cover the entire first surface.

Variation 4 may include a method as set forth in any of variations 1 through 3 wherein providing a metallic material onto the first surface may include flowing the metallic material onto the first surface via a metallic material wire feed.

Variation 5 may include a method as set forth in any of variations 1 through 4 wherein providing a metallic material onto the first surface may include flowing the metallic material onto the first surface via a metallic material powder feed.

Variation 6 may include a method as set forth in any of variations 1 through 5 wherein providing a metallic material onto the first surface may include providing a metallic material layer onto the first surface.

Variation 7 may include a method as set forth in any of variations 1 through 6 wherein the metallic material may include titanium carbide.

Variation 8 may include a method as set forth in any of variations 1 through 7 wherein the substrate may include a cast aluminum-nickel alloy.

Variation 9 may include a method as set forth in any of variations 1 through 8 wherein the substrate may be an injection molding die.

Variation 10 may include a method as set forth in any of variations 7 through 9 wherein the substrate may be tooling.

According to variation 11, a method may include providing a substrate that may include an aluminum alloy and a first surface; machining the first surface to define a cavity; processing the cavity to remove oxidation of the aluminum-nickel alloy; and cladding the substrate with a coating via laser hard facing the substrate. The laser hard facing may include providing a metallic material that may include titanium carbide onto the first surface; providing a laser and applying the focal point of a laser beam on the metallic material; flowing a shielding gas around the laser beam; tracking the laser beam across the metallic material on the first surface of the substrate such that the resulting coating and dilution layer cover the entire first surface prior to flowing a shielding gas around the laser beam; melting the metallic material via the laser beam such that a melt pool, the coating, and dilution layer are formed on the first surface. The method may further include fine machining the coating and polishing the coating.

Variation 12 may include a method as set forth in variation 11 wherein providing a metallic material onto the first surface may include flowing the metallic material onto the first surface via a metallic material wire feed.

Variation 13 may include a method as set forth in any of variations 11 through 12 wherein providing a metallic material onto the first surface may include flowing the metallic material onto the first surface via a metallic material powder feed.

Variation 14 may include a method as set forth in any of variations 11 through 13 wherein providing a metallic material onto the first surface may include providing a metallic material layer onto the first surface.

Variation 15 may include a method as set forth in any of variations 11 through 14 wherein the substrate may include a cast aluminum-nickel alloy.

Variation 16 may include a method as set forth in any of variations 11 through 15 wherein the substrate may be an injection molding die.

Variation 17 may include a method as set forth in any of variations 11 through 16 wherein the substrate may be tooling.

According to variation 18, a method may include providing a substrate that may include an aluminum-nickel alloy and a first surface; machining the first surface to define a cavity; processing the cavity to remove oxidation of the aluminum-nickel alloy; and cladding the substrate with a coating via laser hard facing the substrate. The laser hard facing may include providing a metallic powder material that may include titanium carbide onto the first surface by flowing the metallic material onto the first surface via a metallic powder material feed; providing a laser and applying the focal point of a laser beam on the metallic powder material; flowing a shielding gas around the laser beam; tracking the laser beam across the metallic powder material on the first surface of the substrate such that the resulting coating and dilution layer cover the entire first surface prior to flowing a shielding gas around the laser beam; melting the metallic powder material via the laser beam such that a melt pool, the coating, and dilution layer are formed on the first. The method may further include fine machining the coating and polishing the coating.

The above description of variations of the invention may be merely demonstrative in nature and, thus, variations thereof are not to be regarded as a departure from the spirit and scope of the inventions disclosed within this document.

What may be claimed is:

1. A method comprising:
   providing a substrate comprising an aluminum-nickel alloy and a first surface;
   machining the first surface to define a cavity;
   processing the cavity to remove oxidation of the aluminum-nickel alloy;
   cladding the substrate with a coating via laser hard facing the substrate wherein the laser hard facing comprises:
   providing a metallic material onto the first surface;
   providing a laser and applying the focal point of a laser beam on the metallic material;
   tracking the laser beam across the metallic material on the first surface of the substrate such that the resulting coating and dilution layer cover the entire first surface prior to flowing a shielding gas around the laser beam;
   melting the metallic material via the laser beam such that a melt pool, the coating, and dilution layer are formed on the first surface;
   machining the coating; and
   polishing the coating.

2. A method as set forth in claim 1, wherein providing a metallic material onto the first surface comprises flowing the metallic material onto the first surface via a metallic material wire feed.

3. A method as set forth in claim 1, wherein providing a metallic material onto the first surface comprises flowing the metallic material onto the first surface via a metallic material powder feed.

4. A method as set forth in claim 1, wherein providing a metallic material onto the first surface comprises providing a metallic material layer onto the first surface.

5. A method as set forth in claim 1, wherein the substrate comprises a cast aluminum-nickel alloy.

6. A method as set forth in claim 1, wherein the substrate is an injection molding die.

7. A method as set forth in claim 1, wherein the substrate is a die.

8. A method comprising:
   providing a substrate comprising an aluminum-nickel alloy and a first surface;
   machining the first surface to define a cavity;
   processing the cavity to remove oxidation of the aluminum-nickel alloy;
   cladding the substrate with a coating via laser hard facing the substrate wherein the laser hard facing comprises:
   providing a metallic material comprising titanium carbide onto the first surface;
   providing a laser and applying the focal point of a laser beam on the metallic material;
   flowing a shielding gas around the laser beam;
   tracking the laser beam across the metallic material on the first surface of the substrate such that the resulting coating and dilution layer cover the entire first surface prior to flowing a shielding gas around the laser beam;
   melting the metallic material via the laser beam such that a melt pool, the coating, and dilution layer are formed on the first surface;
   machining the coating; and
   polishing the coating.

9. A method as set forth in claim 8, wherein providing a metallic material onto the first surface comprises flowing the metallic material onto the first surface via a metallic material wire feed.

10. A method as set forth in claim 8, wherein providing a metallic material onto the first surface comprises flowing the metallic material onto the first surface via a metallic material powder feed.

11. A method as set forth in claim 8, wherein providing a metallic material onto the first surface comprises providing a metallic material layer onto the first surface.

12. A method as set forth in claim 8, wherein the substrate comprises a cast aluminum-nickel alloy.

13. A method as set forth in claim 8, wherein the substrate is an injection molding die.

14. A method as set forth in claim 8, wherein the substrate is a die.

15. A method comprising:
   providing a substrate comprising an aluminum-nickel alloy and a first surface;
   machining the first surface to define a cavity;
   processing the cavity to remove oxidation of the aluminum-nickel alloy;
   cladding the substrate with a coating via laser hard facing the substrate wherein the laser hard facing comprises:
   providing a metallic powder material comprising titanium carbide onto the first surface by flowing the metallic material onto the first surface via a metallic powder material feed;
   providing a laser and applying the focal point of a laser beam on the metallic powder material;
   flowing a shielding gas around the laser beam;
   tracking the laser beam across the metallic powder material on the first surface of the substrate such that the resulting coating and dilution layer cover the entire first surface prior to flowing a shielding gas around the laser beam;
   melting the metallic powder material via the laser beam such that a melt pool, the coating, and dilution layer are formed on the first surface;
   machining the coating; and
   polishing the coating.

* * * * *